US008282026B1

(12) United States Patent
Malicky

(10) Patent No.: US 8,282,026 B1
(45) Date of Patent: Oct. 9, 2012

(54) BEDDING DISTRIBUTOR APPARATUS AND METHOD

(76) Inventor: Michael Malicky, Millersburg, OH (US)

( * ) Notice: Subject to any disclaimer, the term of this patent is extended or adjusted under 35 U.S.C. 154(b) by 477 days.

(21) Appl. No.: 12/546,074

(22) Filed: Aug. 24, 2009

(51) Int. Cl.
*A01C 19/00* (2006.01)
*E01C 19/20* (2006.01)

(52) U.S. Cl. .................... 239/673; 239/674; 239/682

(58) Field of Classification Search .......... 239/650, 239/664, 667, 670–676, 681, 682, 687; 460/111
See application file for complete search history.

(56) References Cited

U.S. PATENT DOCUMENTS

| | | | | |
|---|---|---|---|---|
| 2,988,368 A | * | 6/1961 | Kerr | 239/666 |
| 3,085,807 A | * | 4/1963 | Tyler | 239/665 |
| 3,185,486 A | * | 5/1965 | Haley | 239/673 |
| 3,220,740 A | * | 11/1965 | Kavan et al. | 239/663 |
| 3,539,113 A | * | 11/1970 | Tyler | 239/673 |
| 3,889,883 A | * | 6/1975 | Anderson | 239/679 |
| 5,957,394 A | | 9/1999 | Becker | |
| 5,976,011 A | * | 11/1999 | Hartman | 460/111 |
| 6,378,793 B1 | * | 4/2002 | Lantz | 239/672 |
| 6,517,281 B1 | * | 2/2003 | Rissi | 404/110 |
| 6,648,250 B2 | | 11/2003 | Garnett | |
| 2004/0026544 A1 | * | 2/2004 | Williams et al. | 239/656 |
| 2005/0145399 A1 | | 7/2005 | Nesseth | |

* cited by examiner

*Primary Examiner* — Darren W Gorman
(74) *Attorney, Agent, or Firm* — John D. Gugliotta, PE, Esq

(57) ABSTRACT

A method and apparatus for dispensing animal bedding material is provided for use in an industrial livestock production facility. Bedding material is delivered to the site in a primary dispensing vehicle, which is configured with a walking floor conveyor for allowing a smaller secondary dispensing vehicle to be loaded with the animal bedding material directly from the primary vehicle. The process includes distributing the animal bedding material evenly over the area to be treated directly from the rear of the secondary vehicle in one or more passes along the bedding area. The instant abstract is neither intended to define the invention disclosed in this specification nor intended to limit the scope of the invention in any way.

6 Claims, 14 Drawing Sheets

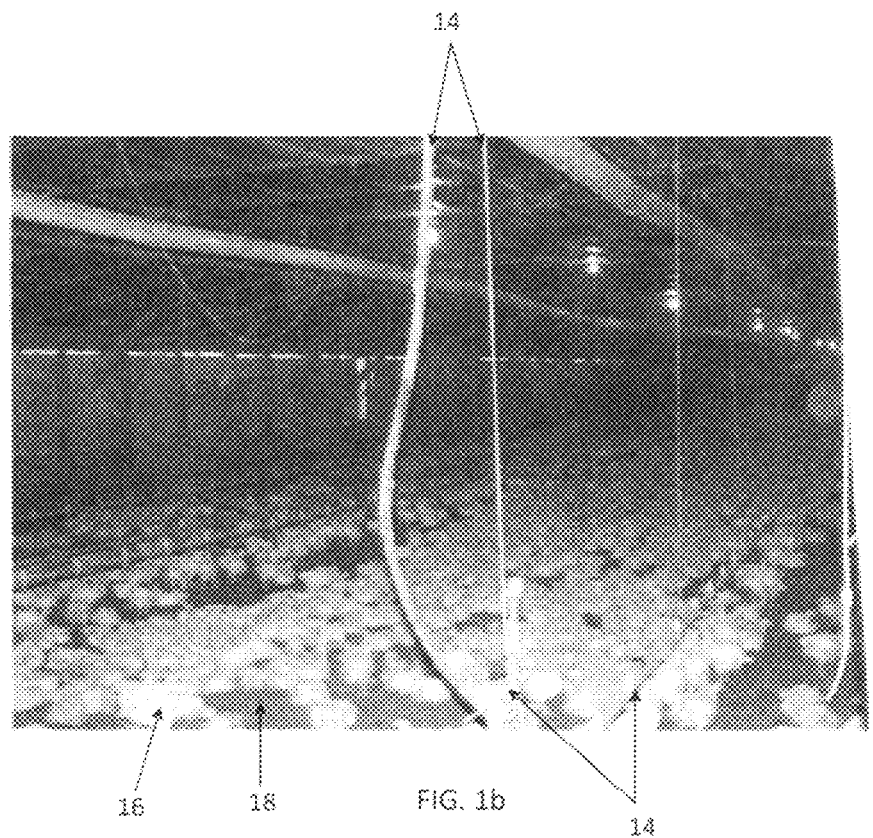

60

BEDDING DISTRIBUTOR APPARATUS AND METHOD

RELATED APPLICATIONS

None.

BACKGROUND OF THE INVENTION

1. Field of the Invention

The present invention relates generally to industrial livestock production and, more particularly, to an improved method of and apparatus for distributing animal bedding material.

2. Description of the Related Art

Commercial production of livestock is increasingly necessary to provide cost effective food production for the nearly 7 billion people currently populating the planet. Factory farms have developed to hold large numbers of animals, typically cows, pigs, turkeys, or chickens, often indoors, typically at high densities. The aim of the operation is to produce as much meat, eggs, or milk at the lowest possible cost.

Typical of one such operation is demonstrated by the industrial production of broiler chickens. A broiler is a type of chicken raised specifically for meat production. Modern commercial broilers are specially bred for meat production and grow much faster than egg breeds. In one step of such operations, a 'grower' specializes in raising a brood from hatchling to maturity, a process which can take approximately 60 days. In such operations, areas for additional efficiency are narrow. Striving for additional yields at maturity is constant; however, one area of overall facility efficiency that receives little attention is the cycle time associated with readying the facility for the next flock.

After a flock has been raised to maturity and sent to production, the growing house needs to be cleaned. The soiled bedding needs to be removed, the facilities cleaned and prepared, and new fresh bedding set in place ready to receive a new brood that has just recently hatched (usually just 24-48 hours prior). To date, the cleaning has been manual, i.e. shovel, load and haul. Similarly, the application of new bedding material is generally placed in a similar manual fashion, i.e., manual shoveling or placing of bedding material (usually sawdust or wood shavings) onto the floor of the growing house. The overall turnaround of such a growing facility can take up to three weeks, and any efficiency obtained will similarly directly impact the overall long term efficiency of the facility.

A search of the prior art did not disclose any patents that read directly on the claims of the instant invention; however, the following references were considered related.

U.S. Pat. No. 6,648,250, issued in the name of Garnet, discloses a spreading machine for spreading animal bedding material. Such a device comprises an augured hopper attachment to a front end loader, and while capable of loading and spreading granular product, such a design is inapplicable in for use in an indoor, industrial livestock production facility.

U.S. Pat. No. 5,957,394, issued in the name of Becker, discloses a bedding material spreader of a similar design (i.e., hopper bucket, auger, and discharge slot). Again, such a design is inapplicable in for use in an indoor, industrial livestock production facility.

And, U.S. Patent Application Publication 2005/0145399, published in the name of Nesseth, again discloses a hopper feeder affixed to a front end loader for capture and distribution of granular material. Again, such a design is inapplicable in for use in an indoor, industrial livestock production facility.

Consequently, a need has been felt for providing an apparatus for and method of distributing livestock bedding material specifically adapted for use with and support of industrial livestock facilities.

SUMMARY OF THE INVENTION

It is therefore an object of the present invention to provide an improved method of and apparatus for distributing animal bedding material within an industrial livestock growing facility, and specifically an industrial broiler growing facility.

The present invention overcomes the disadvantages of the prior art by improving the efficiency of distribution of the materials to be applied as animal bedding material within an industrial livestock growing facility. The invention described and claimed provides a more efficient and cost effective way of delivering and applying a variety of available and used bedding materials in a system which greatly decrease the turnaround time during which a growing facility is not being actively utilized.

In addition, the apparatus disclosed for these applications is of a unique design of a hopper delivery vehicle which includes an sidewall angle of between around approximately 48 degrees to around approximately 50 degrees such that delivery of bedding material is done without bridging of material and allowing for complete dispensing of bedding from the hopper without the need of additional vibration or other mechanical or pneumatic urging mechanisms.

Finally, this system disclosed herein provides efficiency of the process can be seen particularly in the application of efficient consolidation and transportation of materials in large quantities to optimize fuel and transportation assets in a manner that increases the overall efficiency of the operation of an indoor, industrial livestock production facility.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1b is an interior photograph of a typical industrial broiler growing facility is shown according to the PRIOR ART;

DESCRIPTION OF THE PREFERRED EMBODIMENTS

Figure 1A:
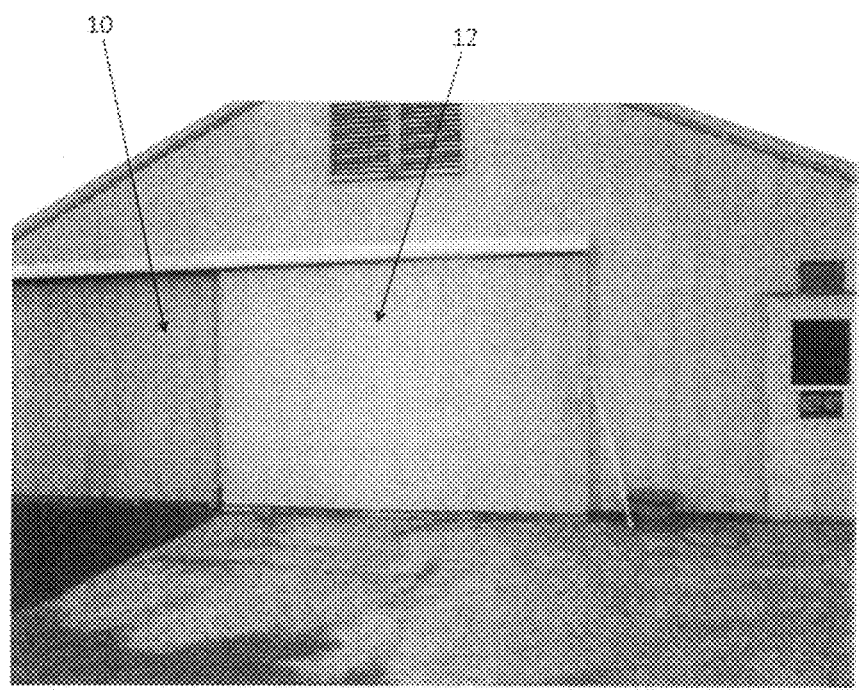
FIG. 1a is an exterior photograph of a typical industrial broiler growing facility is shown according to the PRIOR ART.

Referring to FIG. 1a and FIG. 1b, a typical industrial broiler growing facility 10 is shown according to the PRIOR ART. Such a facility seeks to minimize the variability of environment (light, temperature, humidity, availability of food and water, etc) in order to maintain growing conditions to allow for maximum yields at maturity. Such a growing house 10 is usually of a standard dimension, either 40 or 60 feet wide by 120 or 140 feet long, depending upon the size of the operation desired. In order to best control heat, light and humidity, the overall height of the facility is limited to the extent possible. Access through the facility for harvest or cleanout is through a wide door 12 along one side, with an egress door (not shown) on the opposite side thereof. To further accommodate harvest or cleanout, the feeding and hydration system, generally shown as 14, is designed to retract upward in order to provide for unobstructed access to collection of the broilers 16 when mature, or access to the spent bedding 18 during cleanout.

It is in this environment that the best mode for carrying out the invention is presented in terms of its preferred embodiment, herein depicted within the FIGS. 2-8.

1. Detailed Description of the Figures

Figure 2A:
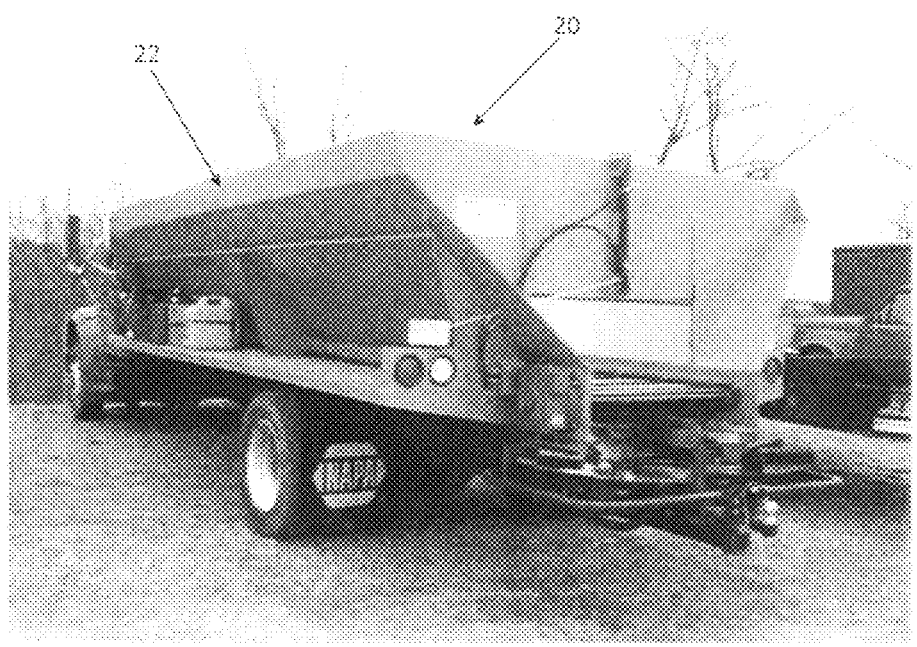
FIG. 2a is a rear perspective view of an improved bedding distributor according to the preferred embodiment of the present invention.
Figure 2B:
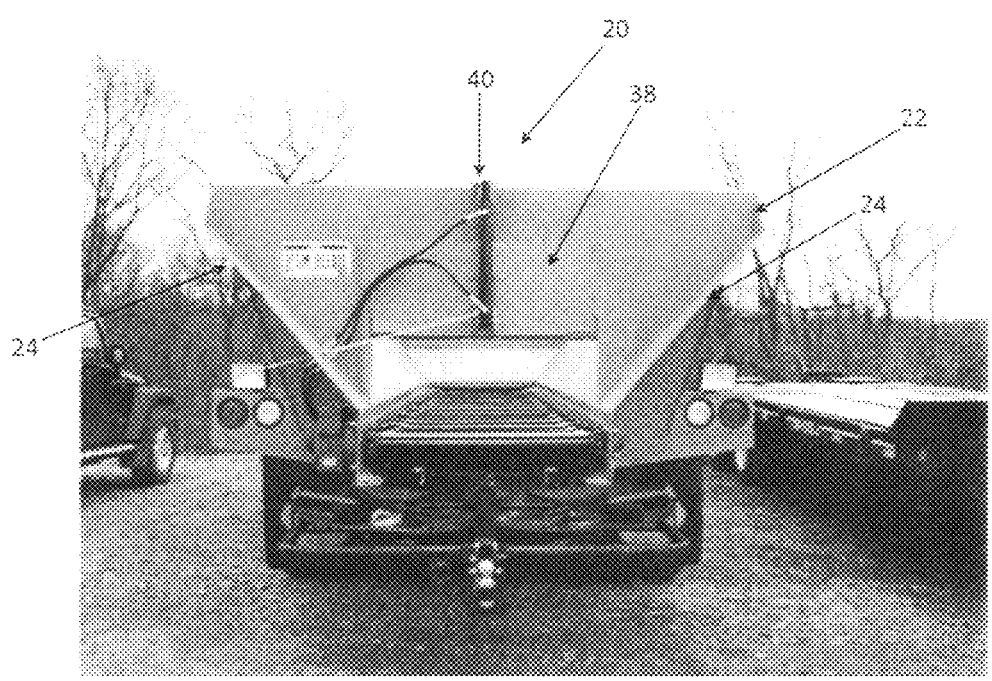
FIG. 2b is a rear elevation view thereof showing in detail the hopper 22 for use therewith.
Figure 3:
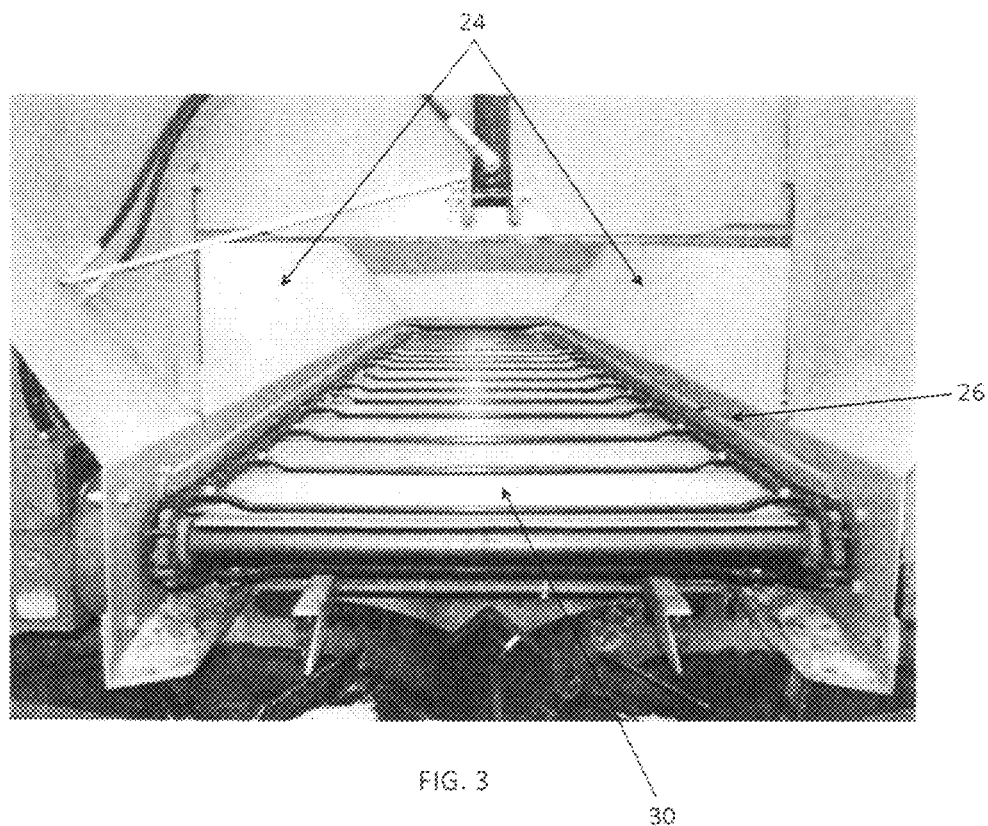
FIG. 3 is a rear detailed view of a walking floor conveyor 30 located at the bottom 26 of the hopper 22 for use therewith.
Figure 4:
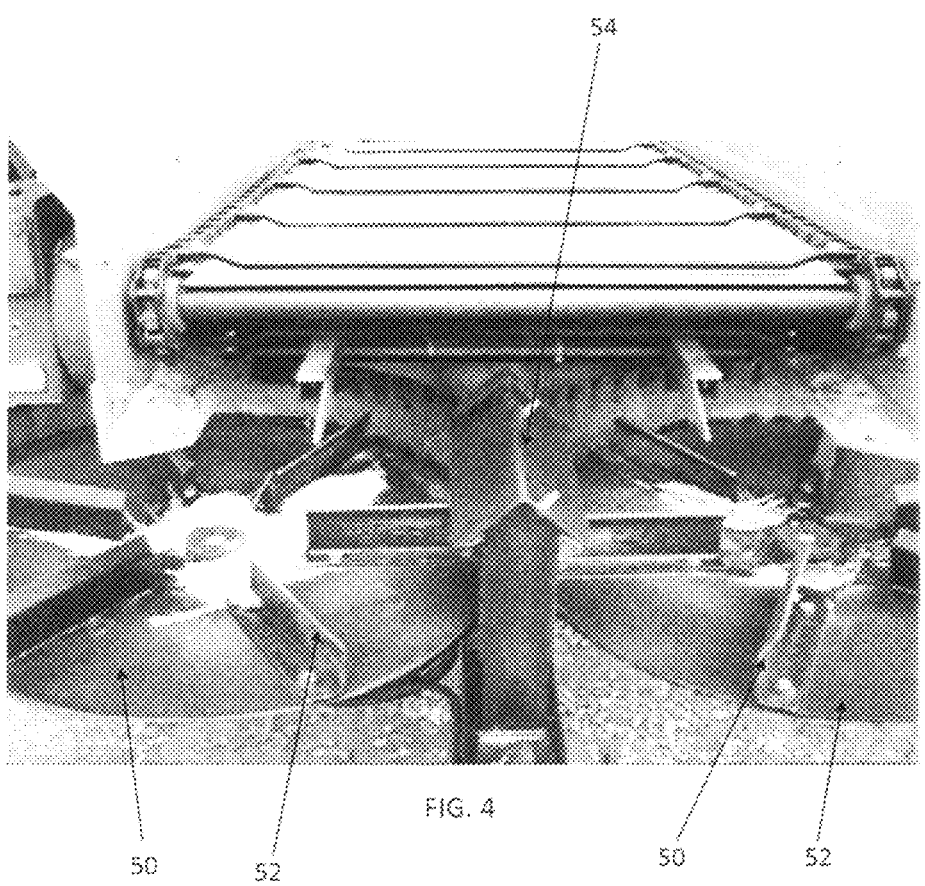
FIG. 4 is a rear detailed view of a dispensing mechanism 32 for use therewith and extending from the rear of the truck 20.
Figure 5A:
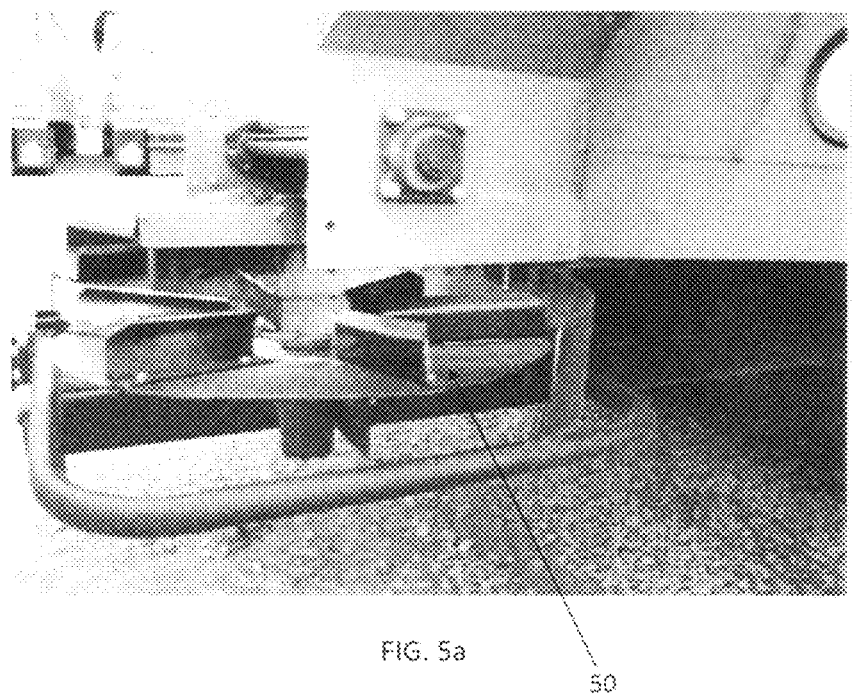
FIGS. 5a and 5b are side detailed views thereof.
Figure 5B:
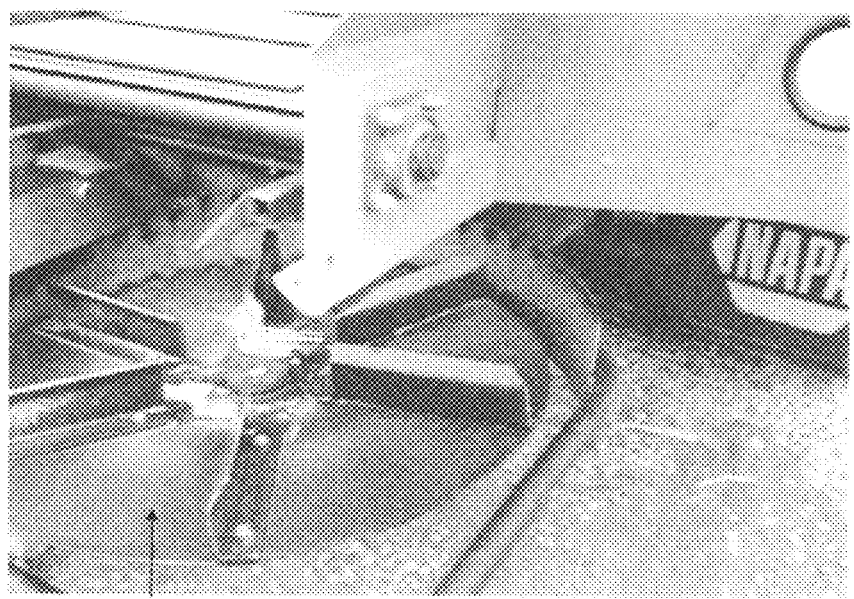
Figure 6A:
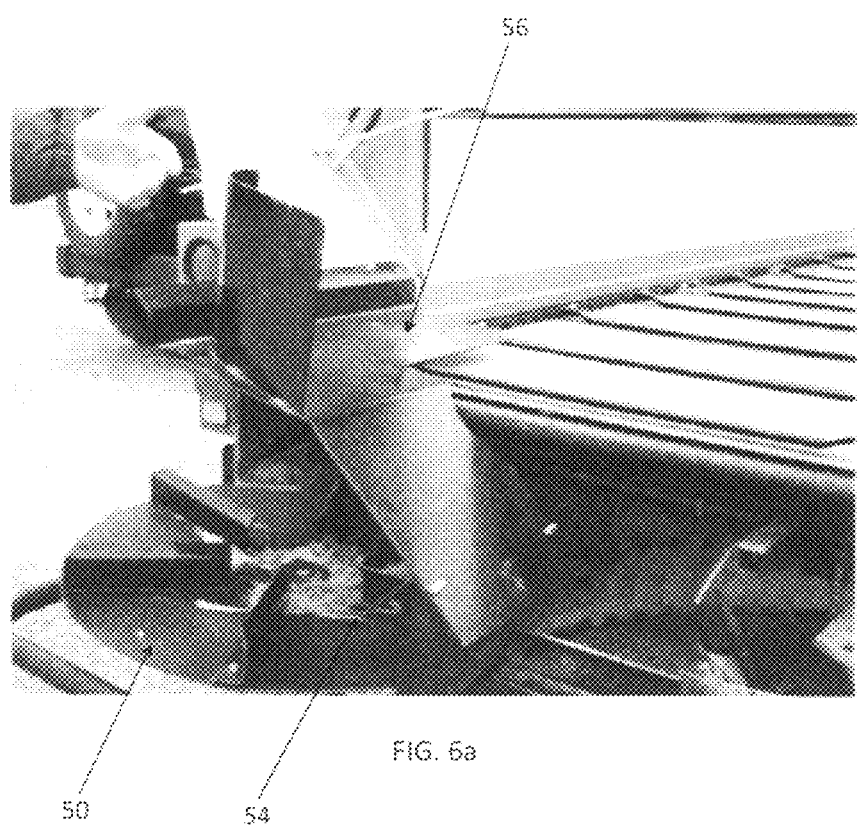
FIGS. 6a and 6b are a partial perspective view thereof shown with an optional diverter plate 56 installed.
Figure 6B:
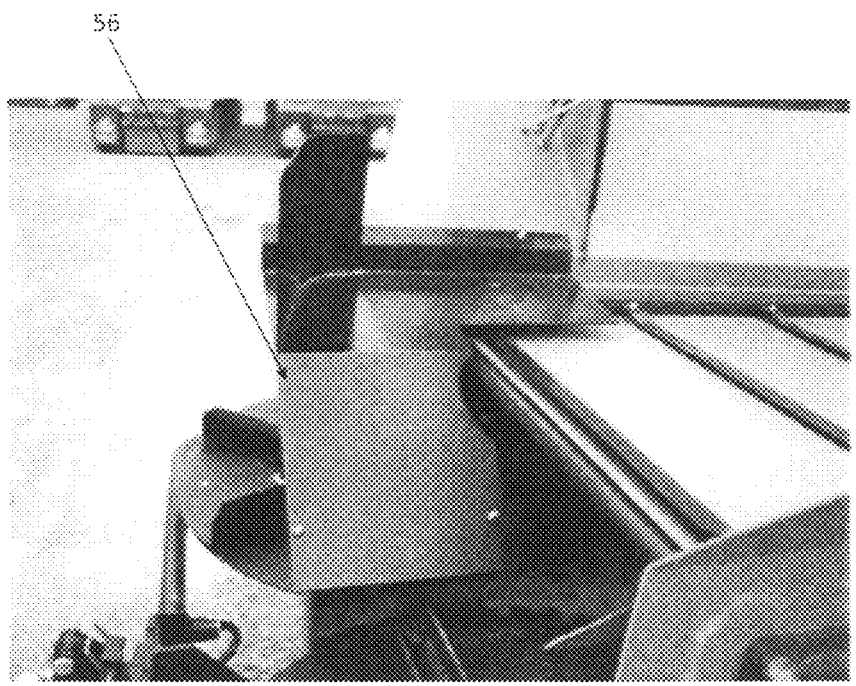
Figure 7A:
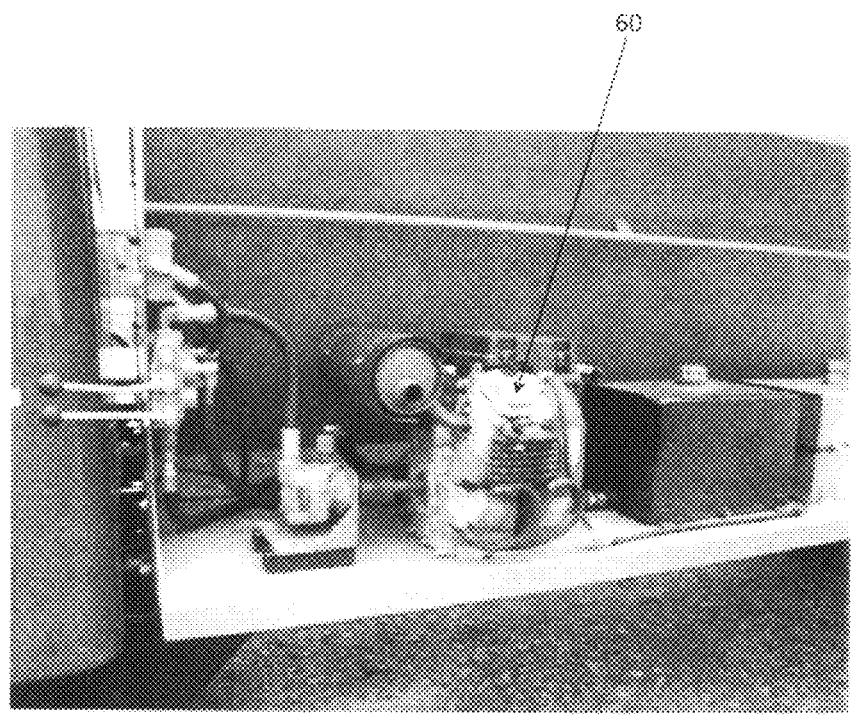
FIGS. 7a, 7b and 7c are views showing an auxiliary hydraulic drive system 60 provides power to the dispensing mechanism 32 in order to rotate the distributor plates 50.
Figure 7B:
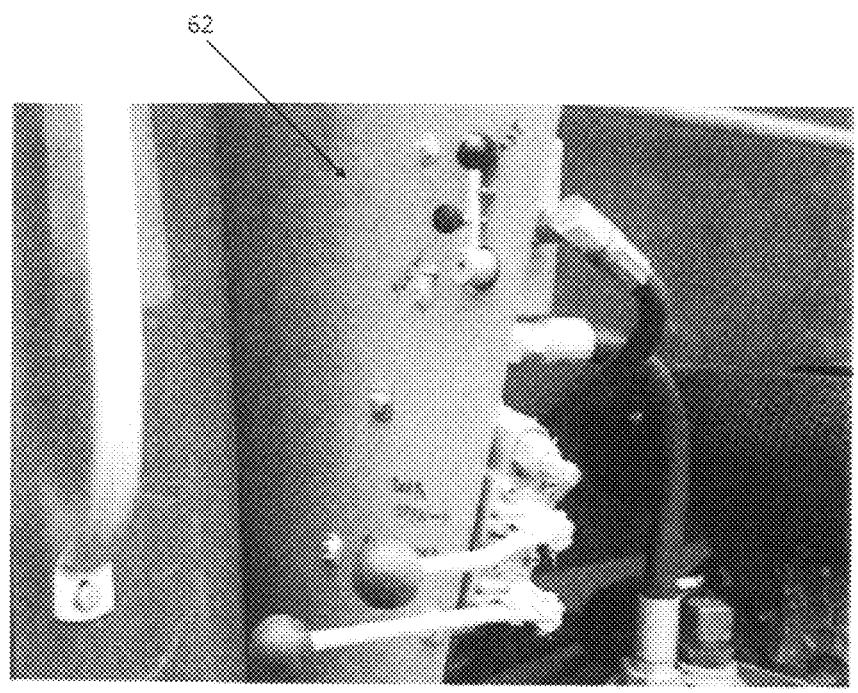
Figure 7C:
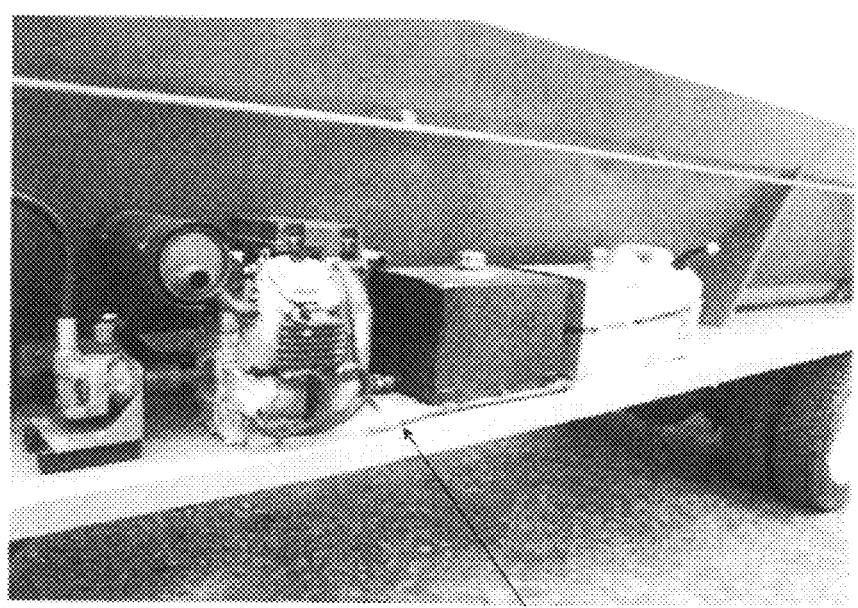
Figure 8:
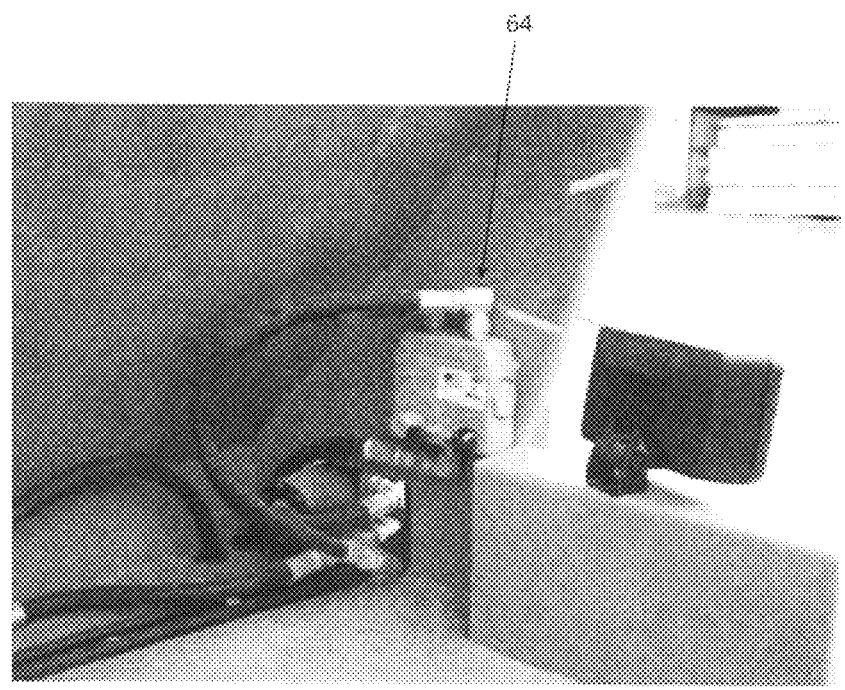
FIG. 8 is a partial perspective view showing a hydraulic drive mechanism for use therewith for delivery operational power to the dispensing mechanisms 32.

Referring now to FIG. 2a-2b, there is shown generally at 20, an improved bedding distributor that is the primary delivery vehicle for the system. The vehicle 20 comprises a basic truck frame for a truck having a total vehicle gross weight of 16,000 to 33,000 pounds. The vehicle 20 is equipped with a hopper type body 22 having sloping sides 24 to allow the load to be funneled toward the bottom 26 of the hopper 22 as the load is dispensed. As shown best in conjunction with FIGS. 3-4, extending along the bottom 26 of the hopper 22 is a walking floor conveyor 30, and extending from the rear of the truck 20 is the dispensing mechanism 32. The conveyor 30 can consists of a chain link conveyer of any known type. The chain link conveyer runs the entire length of the lower surface of the hopper 26. The chain link convey is activated by hydraulic motors supplied with high-pressure hydraulic fluid from a pump driven by a power-takeoff from the truck engine or from a separate power source. The pump speed is controlled by a control panel on the side of the apparatus 20. Aggregate (not show) is released from the hopper type body 22 by opening a gate 38 which is opened by a hydraulic piston 40 controlled by the control panel. The rate of delivery of aggregate can be controlled by regulating the speed of the motors, by adjusting the opening of the gate 38, and/or by the speed of the vehicle truck engine which powers the power take-off feeding the hydraulic pump.

As shown best specifically in FIG. 2b, it is a specific teaching and improvement of the present invention that the sloping sidewalls 24 of the hopper 20 be formed at an angle around 50 degrees relative to the horizontal plane of the conveyor 30, with a preferred embodiment of the present invention including such an angle of between around approximately 48 degrees to around approximately 52 degrees, with a further preferred angle of approximately 49 to 50 degrees. It has been found that in using available bedding materials of sawdust and wood shavings that such an angle is above the angle of repose or maximum angle of a stable slope determined by friction, cohesion and the shapes of the particles of such material. Consequently, when delivering the material such a sidewall design eliminates bridging of material and allows for complete dispensing of bedding from the hopper without the need of additional vibration or other mechanical or pneumatic urging mechanisms.

As shown in greater detail in conjunction with FIGS. 4-6b, the dispensing mechanism 32 is located approximately four feet above the ground so that a vehicle 22 can be driven along the path for loading. The dispensing mechanism 32 comprises a pair of rotating distributor plates 50 located at the discharge of the walking floor conveyor 30. These distributor plates 50 rotate at a relatively high rate of speed such that material accumulated on the plates 50 between upwardly directed baffles 52 are discharged in a lateral outward direction. A central directing baffle 54 directs outwardly flowing aggregate evenly between the two distributor plates 50 upon discharge. As shown best in conjunction with FIG. 6a-6b, an optional diverter plate 56 can be installed between one side 22 and the central directing baffle 54 in order to create a diversion path directing the entire aggregate discharge to one particular distributor plate 54 or the other.

Referring now to FIG. 7a-7c and FIG. 8, an auxiliary hydraulic drive system 60 provides power to the dispensing mechanism 32 in order to rotate the distributor plates 50. Separate controls 62 allow for operator control of distributor plate speed, door position, and conveyor floor speed in order to accommodate a given application.

2. Operation of the Preferred Embodiment

In operation of the present invention it is to be understood that all of the bedding aggregates applied may have varying compositions, densities, and, as a result, different application characteristics. As a result, lighter and fluffier materials such as sawdust generate lesser momentum and must be distributed with greater velocity, while heaver aggregate or granular materials such as wood shavings and manufactured composite betting products may require lesser velocities for proper, even, and rapid distribution. Any of these may be applied using the equipment described above.

To use the present invention in accordance with a preferred embodiment of the present invention, the user will first clear and prepare the floor area of a growing house in preparation for the application of new bedding material. The bedding material of the desired composition is delivered in large bulk and dispensed into the hopper of the improved bedding distributor that is the primary delivery vehicle for the system. Once full, the vehicle is then driven slowly through the growing house. The walking floor conveyor is regulated to move material from the hopper to the distributor. The distributor speed is then regulated to delivery of material evenly throughout the growing house in an even, planar manner such that the vehicle can generally deliver bedding from side to side in one pass. The hopper is then refilled and the process repeated several times to completely lay new bedding in preparation for the growth of the next flock.

Such a method has been found to eliminate a manual process that used to take many hours to several days, down to a matter of minutes. Efficient consolidation and transportation of materials in large quantities optimizes fuel and transportation assets in a manner that increases the overall efficiency of the operation. The following table lays out the steps described above in a graphical manner to aid in understanding the method of the invention.

TABLE 1

| Step | Description |
| --- | --- |
| 1 | Clean/Prepare Growing House |
| 2 | Deliver Bulk Bedding Material in Vehicle with Walking Floor Conveyor |
| 3 | Dispense along Walking Floor Conveyor to Bedding Distributor Hopper |

TABLE 1-continued

| Step | Description |
|------|-------------|
| 4 | Drive through Growing House Dispensing Bedding |
| 5 | Repeat 3-4 until complete |

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A vehicle for distributing animal bedding material in an indoor, industrial livestock production facility, said vehicle comprising:
 a truck chassis having a hopper body thereon, said hopper body defining a volume by its length, width, and height having an inside surface and sloping sidewalls wherein said sloping sidewalk are formed at an angle relative to a horizontal plane of said truck chassis above an angle of repose of said animal bedding material such that when delivering the animal bedding material, said bedding material is completely dispensed from said hopper; and
 a conveyor running the length of the bottom inside surface of the hopper body in contact with the animal bedding material, said conveyor extending beyond a rear edge of said truck chassis and defining a discharge point for discharging the animal bedding material; and
 a dispensing mechanism in fluid communication with said conveyor and extending from said rear edge of the truck chassis; wherein said dispensing mechanism comprises:
 a pair of rotating distributor plates located at the discharge point of said conveyor;
 a plurality of upwardly directed baffles formed on or attached to an upper surface of said distributor plates; said distributor plates being rotatable at a relatively high rate of speed such that material accumulated on said plates between said baffles is discharged in a lateral outward direction;
 a central directing baffle for directing outwardly flowing aggregate between said pair of distributor plates upon discharge; and
 a diverter plate for operatively directing the entire discharge to one particular distributor plate or the other.

2. The vehicle of claim 1, wherein said conveyor comprises a chain link conveyer;
 wherein said conveyor is activated by at least one hydraulic motor supplied with high-pressure hydraulic fluid from a pump driven by a power-takeoff from the truck engine or from a separate power source.

3. The vehicle of claim 1, further comprising an opening gate for controlling the rate of delivery of bedding material from said hopper.

4. The vehicle of claim 1, wherein said truck chassis comprises a basic truck frame for a truck having a total vehicle gross weight of between 16.000 to 33.000 pounds.

5. The vehicle of claim 1, wherein said angle of said sidewalls is between around approximately 48 degrees to around approximately 52 degrees.

6. The vehicle of claim 1, wherein said angle of said sidewalls is around approximately 50 degrees.

* * * * *